United States Patent
Bjornen

(10) Patent No.: US 8,658,014 B2
(45) Date of Patent: Feb. 25, 2014

(54) ELECTROCOAGULATION FOR REMOVAL OF DISSOLVED NAPHTHENIC ACIDS FROM WATER

(75) Inventor: Kay K. Bjornen, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 194 days.

(21) Appl. No.: 13/020,377

(22) Filed: Feb. 3, 2011

(65) Prior Publication Data

US 2011/0192730 A1 Aug. 11, 2011

Related U.S. Application Data

(60) Provisional application No. 61/301,962, filed on Feb. 5, 2010.

(51) Int. Cl.
C02F 1/463 (2006.01)

(52) U.S. Cl.
USPC ............................ 204/554; 204/660; 205/742

(58) Field of Classification Search
USPC ........................................................ 205/742
See application file for complete search history.

(56) References Cited

U.S. PATENT DOCUMENTS

| | | | | |
|---|---|---|---|---|
| 6,960,301 B2 * | 11/2005 | Bradley | | 210/663 |
| 7,575,689 B1 * | 8/2009 | Panjala et al. | | 210/694 |
| 7,795,332 B2 * | 9/2010 | Hintzer et al. | | 523/310 |
| 2007/0068826 A1 * | 3/2007 | Morkovsky et al. | | 205/742 |

* cited by examiner

Primary Examiner — Keith Hendricks
Assistant Examiner — Salil Jain
(74) Attorney, Agent, or Firm — ConocoPhillips Company

(57) ABSTRACT

A method of reducing naphthenic acids in a wastewater stream. The method begins by processing the wastewater stream to produce a treated wastewater stream with an electrocoagulation device to induce flocculation of the naphthenic acids. The reduction of the naphthenic acids in the wastewater stream occurs from separating flocculated naphthenic acids to produce the treated wastewater stream.

9 Claims, 1 Drawing Sheet

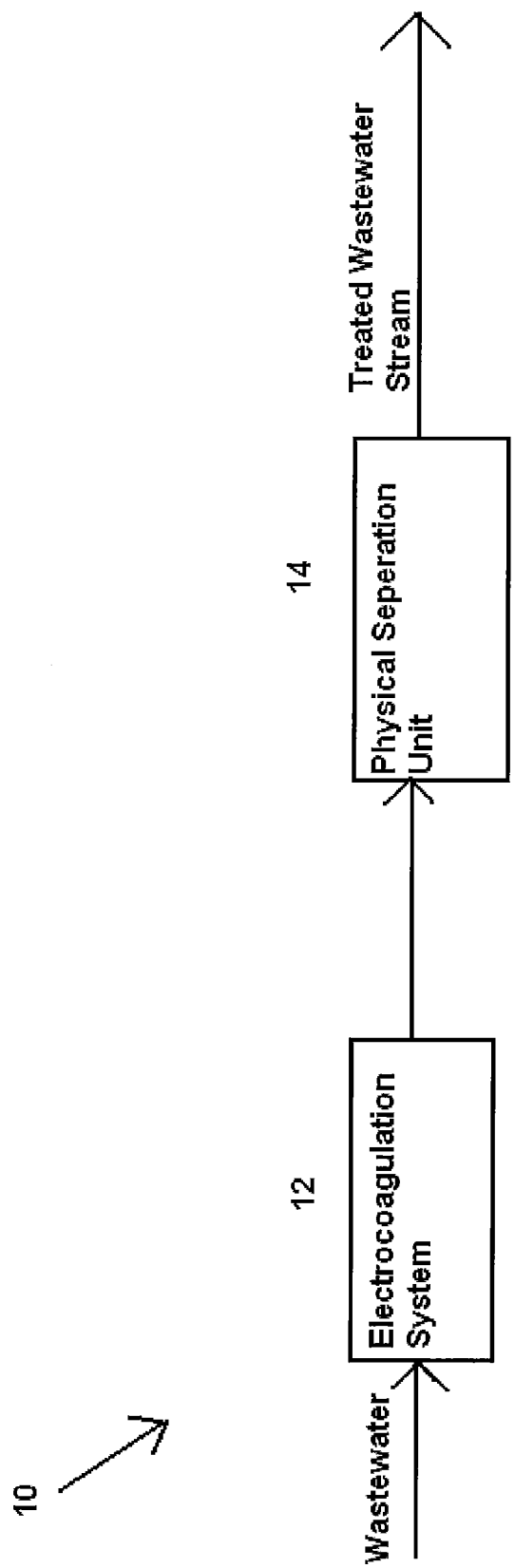

US 8,658,014 B2

ELECTROCOAGULATION FOR REMOVAL OF DISSOLVED NAPHTHENIC ACIDS FROM WATER

CROSS-REFERENCE TO RELATED APPLICATIONS

This application is a non-provisional application which claims the benefit of and priority to U.S. Provisional Application Ser. No. 61/301,962 filed Feb. 5, 2010, entitled "ELECTROCOAGULATION FOR REMOVAL OF DISSOLVED ORGANICS FROM WATER," which is hereby incorporated by reference in its entirety.

STATEMENT REGARDING FEDERALLY SPONSORED RESEARCH OR DEVELOPMENT

None

FIELD OF THE INVENTION

A method of reducing naphthenic acids in the wastewater stream through electrocoagulation.

BACKGROUND OF THE INVENTION

Wastewater in this application refers to any aqueous fluid that without prior treatment is not suitable for human consumption or industry application or discharge from any facility because of the existence of natural or artificial contaminants. The contaminants include organics, particulates, sub-micro particles, microorganisms such as viruses and bacteria, and dissolved metals. Wastewater is being continuously generated by nature (e.g., storm, mudslides, animals, and growth of microorganisms) and human activities (e.g., domestic consumption, and industry applications); it imposes a grave challenge to provide suitable water supply for human consumption and industry applications because of limited water reservoir on the Earth. Therefore, wastewater treatment is critical for provision of reusable water and limit of spreading of contamination from untreated discharge from wastewater-generating industries.

Electrolysis process (often referred as electrocoagulation) has been proven to be able to treat a variety of wastewater including paper pulp mill waste, metal plating, tanneries, caning factories, steel mill effluent, slaughterhouses, chromate, lead and mercury-laden effluents, domestic sewage, and radioactive materials. It has the capability of removing a large range of contaminants under a variety of conditions ranging from: suspended solids, heavy metals; petroleum products, color from dye-containing solution, aquatic humus, and defluoridation of water. The treatment provides clear, clean, odorless and reusable water.

Electrocoagulation is a complex process with a multitude of mechanisms operating synergistically to remove contaminants from wastewater. Electrocoagulation employs a pair of electrodes to neutralize small charged particles in colloidal suspension. The electrodes are usually made of aluminum or iron. When the electrodes (anode and cathode) are subjected to a specific current density, the anodes are oxidized and form metal ions (either $Fe^{+2}$, $Fe^{+}$ or $Al^{+3}$) in solution that react with hydroxide (OH—) anions created in the electrocoagulation process. This leads to the formation of metal hydroxide ions, either cationic or anionic species depending on the pH of the wastewater. A combination of inert anodes and metal (titanium) cathodes can also be used. The inert electrodes accomplish contaminant destabilization utilizing the transfer of electrons within the electrolyte. The transfer of electrons and formation of protons ($H^+$) created in the electrocoagulation process can effectively destabilize a range of metal and organic contaminant species.

A typical electrocoagulation reactor contains a series of substantially parallel electrolytic plates or electrodes through which the wastewater to be treated travels in a serpentine path while being exposed to a strong electric field or voltage. For over the past twenty years, in order to try to find a more environmentally friendly way to treat wastewater, many electrocoagulation (EC) systems were designed and built for many wastewater treatment applications. For example, U.S. Pat. No. 6,689,271 discloses an apparatus for electrocoagulation treatment of industrial wastewater. However, a broad use of the EC systems is limited by unsolved technical obstacles.

The main technical obstacles affecting the efficiency and performance of EC devices include the corrosion and passivation of electrodes and the accumulation of gases in an EC device. Electrodes are easily coated with contaminants, corroded and oxidized by wastewater, thus unable to evenly distribute the ion density in wastewater. Therefore, regular cleaning and replacement of electrodes were normally required. In addition, the oxygen and hydrogen gases are gathered over time at the electrodes and not utilized fully for treating the wastewater, causing a reduction or stoppage of electrolysis action after some time. These result in higher electrical power consumption than expected, slower separation of flocculants from the water at the output, higher percentage of sludge and lower percentage of floating flocculants due to inefficient use of hydrogen gas, and required post-treatment of sludge.

Attempts have been made to address the problem of passivation of electrodes during the electrocoagulation process by constructing self-cleaning electrolytic cells. For example, US 2003/0222030 A1 discloses an electro-coagulation treatment system with an electrolytic cell including an anode and a helical cathode. It claims that the provision of a helical cathode in the form of a helically wound coil of a wire or rod of circular cross section provides an arrangement in which the cell is automatically self-cleaning in that the coagulated precipitates are carried from the cell by the flow of the water. However, the construction of such a helical cathode is a challenge and increases its cost. In addition, CN 01108767.6 discloses an EC device with a wiper to remove any deposits from the surfaces of electrodes. However, the wiper is in firm contact with surfaces of electrodes, and this causes unnecessary wearing out of the electrodes.

Attempts also have been made to reduce the sludge by increasing the flocculants. For example, U.S. Pat. No. 6,719,894 discloses an apparatus for treating organics, particulates and metal contaminates in a waste fluid. The apparatus has a pressurizing means for pressurizing waste fluid to be treated in the reactor vessel so that water, organics, particulates and metal contaminants form dissolved gases and form precipitate particles in the pressurized waste fluid. When the pressure of the treated waste fluid is reduced, dissolved gases evolve from the waste fluid causing said precipitate particles to float to a fluid surface for removal. However, the introduction of pressure complicates the system.

SUMMARY OF THE INVENTION

A method of reducing naphthenic acids in a wastewater stream comprising naphthenic acids. The method begins by processing the wastewater stream to produce a treated wastewater stream with an electrocoagulation device to induce flocculation of the naphthenic acids. The reduction of the naphthenic acids in the wastewater stream occurs from separating flocculated naphthenic acids to produce the treated wastewater stream.

The present method also describes a method of treating a wastewater stream comprising at least 0.025 wt % naphthenic acids. The wastewater stream is processed to produce a treated wastewater stream with an electrocoagulation device to induce flocculation of the naphthenic acids and to induce flocculation of silica. A 90% reduction of the naphthenic acids and silica in the wastewater stream occurs from physically separating flocculated naphthenic acids and silica to produce the treated wastewater stream

BRIEF DESCRIPTION OF THE DRAWINGS

The invention, together with further advantages thereof, may best be understood by reference to the following description taken in conjunction with the accompanying drawings in which:

FIG. 1 depicts the use of a wastewater treatment system using an electrocoagulation device to remove organics.

DETAILED DESCRIPTION OF THE INVENTION

The present method removes naphthenic acids from a wastewater stream. In the method a wastewater stream containing naphthenic acids is processed with an electrocoagulation device to induce flocculation of the naphthenic acids. The reduction of the naphthenic acids in the wastewater stream occurs from separating flocculated naphthenic acids to produce the treated wastewater stream. In this embodiment it is possible that at least 80% of naphthenic acids are removed from the wastewater stream, or even 90% or even up to 93%.

In an alternate embodiment the present method can be a method to remove both silica and naphthenic acids from a wastewater stream. In this embodiment the method will remove both naphthenic acids and silica with the electrocoagulation device by individually inducing flocculation of the naphthenic acids and the silica. In this embodiment up to a 90% reduction of the naphthenic acids and silica in the wastewater stream occurs from physically separating flocculated naphthenic acids and silica to produce the treated wastewater stream. It is also possible that up to 80% of the silica are removed from the wastewater stream, or even 85% or even up to 90%.

The wastewater stream can be any aqueous stream containing naphthenic acids from a source such as, but not limited to, a petroleum refinery, or a mining operation, or the runoff from an irrigation stream which has contacted naphthenic acids containing soil, or a power plant and is most typically a wastewater stream, also referred to herein as a feed stream, from a petroleum refinery. In one embodiment the wastewater stream can come primarily from a steam assisted gravity drainage system.

The naphthenic acids typically include phenols and glycols. The naphthenic acid would mostly likely have the formula $C_nH_{2n}-zO_2$; wherein z=0, 2, 4, 6, 8, 10, or 12; and wherein n ranges from 6 to 46. More preferably, n ranges from 10 to 24 and most preferably n ranges from 14 to 22. These naphthenic acids can be alkyl, aryl, aliphatic or aromatic molecules and, if aromatic, can have from one to six aromatic rings, including naphthene, with either carbonyl and/or alcohol functional groups. The wastewater stream should contain at least 0.025% naphthenic acid and can contain up to 100 ppm naphthenic acids, 200 ppm, 250 ppm, 265 ppm, 275 ppm or even up to 300 ppm.

Where the wastewater stream contains silica, the typical size of the silica can range from 10μ to 90μ.

The electrocoagulation device can be any typical electrocoagulation device commercially available. In this embodiment the electrocoagulation device can include a housing defining a reaction chamber, and a plurality of spaced reaction plates/blades which are oriented in a vertical position within the reaction chamber. An inlet is provided to allow a desired flow of liquid into the reaction chamber and into the gaps or spaces between the blades. An outlet is provided at an elevation higher than and downstream of the inlet for allowing the treated wastewater to flow from the chamber after the wastewater has been treated in the chamber. Selected blades can connect to electrical leads which carry an input line voltage. An electrical field is created in the chamber between the electrically connected blades. The electrical leads may be attached to selected blades in order to provide the reaction chamber with the desired voltage and amperage to optimize the electrocoagulation of the particular liquid. The ability to vary voltage and amperage within the electrical field of the chamber can be achieved without the use of a separate transformer. The wastewater flow is in an upward direction through the reaction chamber in the gaps between the plates/blades. Accordingly, the outlet is positioned at the higher level above the inlet. A pump may be placed upstream of the inlet in order to provide additional head for the flow of liquid passing through the apparatus. A series of prefilters or other preconditioning means may be placed in line with the pump and also upstream of the inlet in order to remove solids or other materials which may otherwise clog the reaction chamber. A control unit rectifies the incoming AC line voltage to a DC voltage. Electrical leads interconnect the blades to the DC voltage made available by the control unit. In addition to rectifying the incoming line voltage, the control unit may incorporate a number of other functions which helps to control the apparatus, such as a means to control the speed of the pump and a voltmeter and ammeter to monitor the conditions within the chamber. However, the control unit does not need a transformer as the electrical connections made with the blades allow the desired voltage and amperage therein to be adjusted, as further discussed below. Additionally, the control unit can be in the form of a programmable logic controller which could not only monitor status condition inputs, but also produce outputs to control the electrocoagulation process. For example, the voltage polarity of the electrical leads extending from the control unit can be reversed based upon a timing sequence controlled by the controller. As a further example, the control unit can measure the flow rate of the wastewater and adjust it accordingly by either manipulating the pump speed, or adjusting the flow rate through a valve positioned upstream of the inlet.

The electrocoagulation device generates metal ions, such as iron, copper or aluminum through electrochemical dissolution of the sacrificial anode. The presence of the metal ions creates a surface charge imbalance in the suspended particulates and dispersed oil droplets, resulting in coagulation or flocculation of the particulates or oil.

For an aluminum anode, various forms of charged hydroxyl ($OH^-$) and $Al^{+3}$ species might be formed under appropriate conditions. These gelatinous hydroxyl cationic/anionic complexes can effectively destabilize contaminant particles by adsorption and charge neutralization, resulting agglomeration due to the attractive van der Wall forces and formation of stable precipitates that could then be separated by conventional separation technique. Typical chemical reactions at both the aluminum anode and cathode are shown below:

Anode:

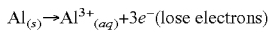

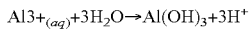

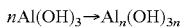

Cathode:

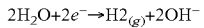

The electrochemical dissolution of the aluminum anode produces $Al^{3+}$ ions which further react with $OH^-$ ions (from cathode), transforming $Al^{3+}$ ion initially into $Al(OH)_3$ and then into the gelatinous hydroxyl precipitate $(Al_n(OH)_{3n})$. Depending on the pH of the wastewater, different ionic species will also be formed in the medium such as: $Al(OH)^{2+}$, $Al_3 2(OH)_2^{2+}$, and $Al(OH)_4$. At the cathode, hydrogen $(H_2)$ gas and hydroxide $(OH^-)$ ions are formed from the division of $H_2O$ The electrochemical dissolution of the iron anode produces iron hydroxide, $Fe(OH)_n$ where n=2 or 3. There are two proposed mechanisms for the production of the iron hydroxide. Like the gelatinous aluminum hydroxyl precipitate $(Al_n(OH)_{3n})$, the iron hydroxide precipitate $(Fe(OH)_n)$ formed remains in the aqueous medium (stream) as a gelatinous suspension. This suspension can wastewater contaminants by coagulation. The cathode is subject to scale formation, which can impair the operation of the system. Typical chemical reactions at both the iron anode and cathode are shown below:

Anode:

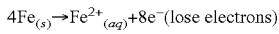

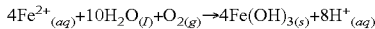

Cathode:

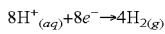

Overall:

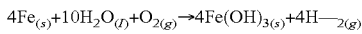

Anode:

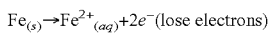

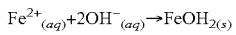

Cathode:

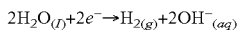

Overall:

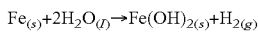

After the wastewater has been electrolytically treated, the wastewaters with flocculated contaminants are removed by passing through a secondary separation treatment in order to remove the contaminants. It is the intent of the electrocoagulation device of this invention to remove the bulk of contaminants in secondary separation treatment. Although some contaminants will fall out of the liquid stream to the bottom of the reaction chamber, it is desirable to treat the liquid within the reaction chamber and then by force of the liquid stream, move the contaminants to a downstream secondary separation treatment point. If the bulk of the contaminants were allowed to settle out of the liquid stream within the reaction chamber, then the reaction chamber would have to be cleaned and serviced more frequently. Secondary separation treatment can be achieved with a number of devices placed downstream of the reaction chamber. For example, secondary separation can be accomplished with clarifiers, filters, centrifugal separators, or centrifuges. Each of these devices can be used within secondary separation as referred to herein, and any one or a combination of these devices may be used depending upon the type of liquid stream treated.

FIG. 1 illustrates a wastewater treatment system 10 according to the present invention. Treatment system begins with an electrocoagulation device 12. The electrocoagulation system 12 functions as a flocculation system that flocculates naphthenic acids or even naphthenic acids and silica in the wastewater stream. The wastewater stream then passes through a physical separation unit 14 to separate out the flocculated waste from the treated wastewater stream. Different methods that can be used to separate out the flocculated waste include flotation, settling and/or filtration.

This wastewater treatment system can be set up as a continuous system where potentially 200,000 gallons of wastewater are treated. Continuous flocculation results in particles or oil droplets large enough to separate. In the case of dissolved organics, it is likely that the mode of coagulation is not charge imbalance by bridging through association of the metal ions with the polar (charged) functionalities. The association of the metal ions also tends to neutralize the acidic forms, causing the organics to become less soluble.

EXAMPLE 1

Example 1 tested the use of the present method with steel electrodes. In this example 250 grams of a brine sample was tested for naphthenic acids before and after electrocoagulation treatment. Before treatment the total amount of the naphthenic acids were 0.0662 grams or 265 ppm. The brine sample was treated with the electrocoagulation device with steel electrodes for around one minute. The amount of naphthenic acids after treatment was 0.0539 grams or an 18.6% reduction in naphthenic acids.

Example 2 tested the use of the present method with aluminum electrodes. In this example 250 grams of a brine sample was tested for naphthenic acids before and after electrocoagulation treatment. Before treatment the total amount of the naphthenic acids were 0.0662 grams or 265 ppm. The brine sample was treated with the electrocoagulation device with aluminum electrodes for around two minutes. The amount of naphthenic acids after treatment was 0.0049 grams or a 92.6% reduction in naphthenic acids.

Naphthenic acids are quantified by weighing a known quantity of the wastewater and adjusting the pH to below 2. The naphthenic acids are protonated and the solubility is reduced, resulting in a precipitate. The sample is filtered through a weighed filter paper and dried. Following electrocoagulation of the wastewater, a weighed sample is also pH adjusted and weighed. The difference between the weights is the quantity of naphthenic acids removed by the process.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of any reference is not an admission that it is prior art to the present invention, especially any reference that may have a publication date after the priority date of this application.

The invention claimed is:

1. A method comprising of: providing a wastewater stream from a steam assisted gravity drainage system comprising naphthenic acids; processing the wastewater stream with an electrocoagulation device to induce flocculation of the naphthenic acids to provide flocculated napthenic acids; and separating the flocculated naphthenic acids to reduce the naphthenic acids in the wastewater stream resulting in production of a treated wastewater stream.

2. The method of claim 1, wherein the separating of the flocculated naphthenic acids from the wastewater stream is performed physically.

3. The method of claim 1, wherein at least 90% of the naphthenic acids are removed from the wastewater stream.

4. The method of claim 1, wherein the wastewater stream also comprises silica and the silica is simultaneously removed from the wastewater stream with the electrocoagulation device.

5. The method of claim 4, wherein at least 95% of the silica are removed from the wastewater stream.

6. The method of claim 1, wherein the flocculation occurs without any agent addition to the wastewater stream.

7. The method of claim 1, wherein the wastewater stream comprises at least 0.025 wt % naphthenic acids.

8. The method of claim 1, wherein the method is a continuous method.

9. A method comprising of: providing a wastewater stream from a steam assisted gravity drainage system comprising silica and at least 0.025 wt % naphthenic acids; processing the wastewater stream with an electrocoagulation device to induce flocculation of the naphthenic acids to provide flocculated napthenic acids and to induce flocculation of the silica; physically separating the flocculated naphthenic acids and the silica to achieve a 90% reduction of the naphthenic acids and the silica in the wastewater stream resulting in production of a treated wastewater stream.

* * * * *